US005368924A

United States Patent [19]

Merrill, Jr. et al.

[11] Patent Number: 5,368,924

[45] Date of Patent: Nov. 29, 1994

[54] ANTENNA COVER FABRIC FOR MICROWAVE TRANSMISSIVE EMITTERS

[75] Inventors: Douglas P. Merrill, Jr., Hoosick Falls; Robert F. Hamilton, Eagle Bridge, both of N.Y.

[73] Assignee: AlliedSignal Inc., Morris Township, Morris County, N.J.

[21] Appl. No.: 887,635

[22] Filed: May 22, 1992

[51] Int. Cl.[5] .......................... H01Q 1/42; B32B 7/00; B32B 15/00; D03D 3/00

[52] U.S. Cl. .................................... 428/241; 343/872; 428/245; 428/251; 428/260; 428/268; 428/283; 428/284; 428/285; 428/286; 428/422

[58] Field of Search ............... 428/245, 246, 251, 260, 428/262, 265, 268, 284, 285, 286, 421, 422, 241, 283; 343/872

[56] References Cited

U.S. PATENT DOCUMENTS

| | | | |
|---|---|---|---|
| 3,897,450 | 7/1975 | Fitzrov et al. | 343/797 |
| 3,968,297 | 7/1976 | Sauer | 428/422 |
| 4,610,918 | 9/1986 | Effenberger et al. | 428/245 |
| 4,645,709 | 2/1987 | Klare | 428/251 |
| 4,770,927 | 9/1988 | Effenberger et al. | 428/245 |
| 5,075,065 | 12/1991 | Effenberger et al. | 264/213 |

*Primary Examiner*—James D. Withers
*Attorney, Agent, or Firm*—Roger H. Criss

[57] ABSTRACT

This invention relates to a fluoropolymer coated glass fabric having excellent flexibility, weatherability, ultraviolet light-stability, and moisture-resistance characteristics, which are suitable for protective cover applications, such as antenna cover.

13 Claims, No Drawings

ANTENNA COVER FABRIC FOR MICROWAVE TRANSMISSIVE EMITTERS

BACKGROUND OF THE INVENTION

1. Field of the Invention

The present invention relates to glass fabrics coated with protective layers that provide excellent weatherability, flexibility, moisture-resistance and electromagnetic microwave transmissibility.

2. Description of the Prior Art

The use of microwave antennas, particularly dish antennas, for transmitting and receiving microwave signals from satellites or terrestrial microwave antenna has rapidly been increased. Such dish antennas vary widely in size, but many have diameters of 1 to 7 meters. These antennas are typically placed in a location significantly elevated and remote from the surrounding structures and terrain to prevent reflection of the transmitted electromagnetic waves and to obtain a wide distance coverage. Such elevated locations are typically exposed to harsh weather conditions, such as high winds and extreme temperatures. Consequently, it is desirable that the antenna be equipped with a cover to protect the antenna assembly from the effects of weather, abrasion and photodegradation in order to ensure a reasonably durable service life of the antenna. Additionally, an antenna should be equipped with a protective cover to prevent accumulation of water or ice and uneven exposure to direct sunlight that may alter the electrical characteristics of the antenna and result in degraded antenna performance.

The selection of the cover-material is complicated by various demands imposed on the material. The cover material, for example, must not interfere with the transmissibility of electromagnetic microwaves, must be resistant to photodegradations, particularly to ultraviolet light, must have a very low moisture-absorption property, must have physical integrity to withstand harsh natural elements such as high winds and extreme temperatures, and sufficient flexibility to absorb the impacts of high winds, and falling rain and hail.

In the past, ceramic-type materials were utilized to fabricate antenna covers, but the use of ceramic covers was not satisfactory in that ceramic covers add significant weight to the antenna assembly, are susceptible to cracking, and are not readily adaptable to the varying geometry of antenna configurations. Consequently, polymer coated glass fabrics, particularly fluoropolymer coated fabrics, have been gaining wide acceptance in the antenna industry. Such a use of fluoropolymer coated glass fabric is disclosed, for example, in U.S. Pat. No. 3,896,450 to Fitzroy et al.

Glass fabrics coated with a talc and titanium mixture filled fluoropolymer that may be utilized for antenna cover applications are known in the art. Such fluoropolymer coated glass fabrics are disclosed, for example, in U.S. Pat. Nos. 4,645,709 to Klare; 4,610,918 to Effenberger et al.; and 4,770,927 to Effenberger et al.

However, it is desirable to provide a covering material for microwave antennas that has improved weatherability, flexibility, ultraviolet light-stability and physical strength as well as microwave transmissibility over the prior art fluoropolymer coated glass fabrics. Additionally, it is desirable to provide such an improved fluoropolymer coated glass fabric that is uniformly and completely coated with moisture resistant layers to prevent moisture degradation of the glass fabric.

SUMMARY OF THE INVENTION

In accordance with the present invention, there provided a coated glass fabric having improved flexibility, weatherability, ultraviolet light-stability, and moisture-resistance having coated thereon in sequence coating layers comprising a first layer of a mixture of a perfluoropolymer and a silicone oil, the silicone oil comprises from about 1 to about 30 wt % based on the weight of the perfluoropolymer; a second layer of a perfluoropolymer; a third layer of a glass or mineral filled perfluoropolymer, the glass or mineral filler comprises from about 1 to about 30 wt % based on the weight of the perfluoropolymer; a fourth layer of a titanium dioxide filled perfluoropolymer, the titanium dioxide comprises up to about 70 wt % based on the weight of the perfluoropolymer; and a fifth layer of titanium dioxide filled perfluoropolymer selected from the group consisting of fluorinated ethylene-propylene, perfluoroalkoxy and mixtures thereof, the titanium dioxide comprises up to about 50 wt % based on the weight of the perfluoropolymer.

In addition, the present invention provides a process of manufacturing the improved coated glass fabric that is suitable for use in various applications that are exposed to extreme demanding environmental conditions.

DETAILED DESCRIPTION OF THE INVENTION

As discussed above, according to the present invention, there is provided a fluoropolymer coated glass fabric that provides excellent physical characteristics, making it suitable for use in antenna cover applications. The fluoropolymer coated glass fabric of the present invention comprises five coating layers, and the five coating layer compositions comprise in sequence of a mixture of a perfluoropolymer and a silicone oil, a perfluoropolymer, a glass or mineral filled perfluoropolymer, a titanium dioxide filled perfluoropolymer, and a titanium dioxide filled fluorinated ethylene-propylene (FEP), perfluoroalkoxy (PFA) or mixtures thereof.

Perfluoropolymers are fluoropolymers that do not contain any hydrogen atoms and are known for their resistance to a wide range of chemicals, low coefficients of friction, low surface energy, and excellent hydrophobicity. Examples of perfluoropolymers suitable for use in the present invention include polytetrafluoroethylene (PTFE), FEP, PFA and mixtures thereof. Of these, the most preferred for use herein is PTFE.

The silicone oils suitable for the present invention include methylphenyl silicone, dimethyl polysiloxane, dimethylmethylhydrogen siloxane, methylhydrogen siloxane, and crosslinked reactive silicone oils. Of these, the most preferred is methylphenyl silicone oil.

The substrate glass fabrics of the present invention are glass fabrics woven from a glass yarn, multifilament or monofilament, and non-woven glass fabrics, which are commercially available from various fiberglass fabric manufacturers.

Each coating layer of the present invention is applied preferably by passing the glass fabric through an aqueous dispersion of respective coating compositions and then dried and fused under an elevated temperature that is sufficiently high enough, i.e., above the melting-point of respective perfluoropolymer utilized therein, to completely evaporate any moisture and other carrier fluids from the coating compositions and to melt-fuse the coated fluoropolymer by passing the coated fabric through a dryer before the subsequent coating layer is applied. Preferably, the dryer has at least two heating zones of different temperature settings: a drying zone and a fusing zone. The heating temperature of the initial drying zone is set at a relatively low temperature to evaporate any moisture and carrier fluids from the coated composition without melting the fluoropolymer present therein, preferably at a temperature between about 100° C. and about 200° C., and the heating temperature of the subsequent fusing zone is set at a high temperature to melt-fuse the fluropolymer onto the glass fabric or prior coating layer preferably from about 325° C. to about 425° C.

Optionally, the drying/fusing step of the first two coating layers of the present invention may be modified to produce dried but unsintered coating layers by drying the coated fabric at a temperature below the melting-point of the perfluoropolymer coated thereon. Preferably, the fusing zone is set at a temperature between about 250° C. and about 320° C. Surprisingly, it has been found that the unsintered coating finish of the first two coating layers reduces non-wetting and increases coating pickup-weight of the subsequent coating compositions, and improves coating uniformity and visual characteristics of the subsequent coating layers.

In accordance with the present invention, any conventional method of coating processes, such as dipping, spraying or flow coating, and drying/fusing processes, such as hot-air heating or radiant electric heating, may be utilized.

The coating thickness of each layer of the present invention coated fabric may be of any thickness desired and can be varied to provide optimal properties adapted for each application. Depending on the desired thickness of each layer, the coating process for each coating layer may be repeated with one or more of the respective coating compositions having the same or different constituent concentrations. The preferred thicknesses of each layer herein, as measured in the pickup-weight of the fused coating composition as is conventional in the art, are from about 1 to about 5 ounce/square yard ($oz/yd^2$) (34 to 170 $g/m^2$) for the first layer, from about 3 to about 10 $oz/yd^2$ (100 to 340 $g/m^2$) for the second layer, from about 3 to about 8 $oz/yd^2$ (100 to 270 $g/m^2$) for the third layer, from about 0.5 to about 5 $oz/yd^2$ (17 to 170 $g/m^2$) for the fourth layer, and from about 0.05 to about 1 $oz/yd^2$ (1.7 to 34 $g/m^2$) for the fifth layer.

The first coating layer of the present invention preferably is applied on the glass fabric as an aqueous dispersion that comprises from about 35 to about 55 wt %, more preferably about 40 to about 50 wt %, of a perfluoropolymer based on the total weight of the aqueous dispersion and from about 1 to about 30 wt %, more preferably about 5 to about 20 wt %, of a silicone oil based on the weight of the perfluoropolymer.

The second coating layer preferably is applied as an aqueous dispersion that comprises from about 15 to about 45 wt %, more preferably about 20 to about 40 wt %, of a perfluoropolymer based on the total weight of the aqueous dispersion.

The third coating layer preferably is applied as an aqueous dispersion that comprises from about 25 to about 45 wt %, more preferably about 30 to about 35 wt %, of a perfluoropolymer based on the total weight of the aqueous dispersion and up to about 70 wt %, more preferably 30 to about 60 wt %, of a filler selected from the group consisting of talc, glass beads, amorphous silica and mixtures thereof based on the weight of the perfluoropolymer. Of these fillers, the most preferred is talc.

The fourth coating layer preferably is applied as an aqueous dispersion that comprises from about 25 to about 50 wt %, more preferably about 30 to about 40 wt %, of a perfluoropolymer based on the total weight of the aqueous dispersion and up to about 70 wt %, more preferably about 30 to about 60 wt %, of titanium dioxide based on the weight of the perfluoropolymer.

The fifth coating layer preferably is applied as an aqueous dispersion that comprises from about 15 to about 35 wt %, more preferably about 20 to about 30 wt %, of FEP or PFA based on the total weight of the aqueous dispersion and up to about 50 wt %, more preferably about 20 to about 40 wt %, of titanium dioxide based on the weight of the perfluoropolymer.

In accordance with the present invention, the second layer through the fourth layer and, optionally, the fifth layer coating compositions of the present invention further comprise effective amounts of a viscosity enhancing agent and a surfactant that are conventionally utilized in the art. Preferably, each of the additives comprises from about 0.05 to about 3 wt % of the total weight of each coating composition. The preferred viscosity enhancing agent is selected from the group consisting of metal, preferably alkali metal, neutralized acrylic acids and carboxy polymethylene; and the preferred surfactant is selected from the group consisting of anionic and non-ionic surfactants, e.g., octylpenoxy polyethoxy ethanol, polyalkylene oxide modified hepta methyl trisiloxane and ammonium perfluoro alkyl carboxylate.

The antenna cover fabric of the present invention provides improved weatherability, flexibility, ultraviolet light-stability, physical strength, moisture-resistance and exhibits aesthetically and functionally superior surface characteristics, including an excellent color characteristic. Moreover, the present antenna cover fabric is free from small imperfections, known in the art as "pinholes", frequently found on prior art fluoropolymer coated glass fabrics. Such imperfections contribute to the permeation of moisture into the coated glass fabric, leading to a premature degradation of the glass fabric.

The coating compositions and coating processes of the present invention allow a higher content of the fillers and titanium dioxide to be loaded in the fluoropolymer coating compositions without sacrificing the adhesion strength of the coating compositions compared to the loading level of the prior art fluoropolymer coated fabric compositions since, unlike the prior art practices, the filler and titanium dioxide are added to separate perfluoropolymer compositions and applied in separate layers. As such, it is believed that the voids and grooves of the uneven surface of woven glass fabrics can be evenly filled with the fillers and fluoropolymers, resulting in a highly uniform and completely coated surface that is pinhole-free.

Moreover, it is believed that the coated glass fabric of the present invention provides a superior microwave transmissibility and better weatherability over the prior art glass fabrics coated with fluoropolymers filled with a mixture of a mineral filler and titanium oxide.

Although the present invention is disclosed to illustrate the use of the instant fluoropolymer coated glass fabric for antenna cover, the above-disclosed desirable characteristics and chemical resistance of the fabric provide for other applications such as environmental contamination prevention, e.g., secondary encasement for fuel tanks and the like.

The following example describes in detail a typical process of producing the coated glass fabric of the present invention and is not meant to limit the scope of the present invention.

All references to wt % are based on the total weight of each respective coating suspension, and where necessary pH was adjusted with ammonium hydroxide to maintain a pH value between 8 and 9. The coating process was conducted at the ambient temperature, and a dryer equipped with hot-air heaters having a temperature profile in sequence of 135° C., 177° C., 393° C. and 393° C. was used to dry and fuse the coating compositions.

EXAMPLE

An aqueous suspension of the first layer coating composition was prepared by mixing 45 wt % of PTFE solids (AD639 PTFE, available from ICI Chemicals as a dispersion) and 7.7 wt % of methylphenyl silicone oil (ET-4327, available from Dow Corning as an aqueous emulsion).

Three different aqueous suspensions of the second layer coating composition were prepared. A 20 wt % PTFE dispersion was prepared by mixing 20 wt % of PTFE solids (AD639 PTFE) and 0.125 wt % of a viscosity enhancing agent/film former (Carbopol 934, available from B. F. Goodrich); a 30 wt % PTFE dispersion was prepared by mixing 30 wt % of PTFE solids (AD639 PTFE), 0.125 wt % of Carbopol 932, 0.2 wt % of a surfactant (Fluorad FC-143, available from Minnesota Mining and Manufacturing), and 0.9 wt % of a viscosity enhancing agent (Acrysol RM-5, available from Rohmand Haas); and a 37.5 wt % PTFE dispersion was prepared by mixing 37.5 wt % of PTFE solids (AD639 PTFE), 0.8 wt % of Acrysol RM-5, and 0.3 wt % of Fluorad FC-143.

An aqueous suspension of the third layer coating composition was prepared by mixing 32 wt % of PTFE solids (AD639 PTFE), 16 wt % of talc having a 3-micron average particle size, 1.18 wt % of Acrysol RM-5, and 0.86 wt % of Fluorad FC-143.

An aqueous suspension of the fourth layer coating composition was prepared by mixing 36 wt % of PTFE solids (AD639 PTFE), 18 wt % of titanium dioxide (R-900, available from Du Pont), 0.87 wt % of Acrysol RM-5, and 0.87 wt % of Fluorad FC-143.

An aqueous suspension of the fifth layer coating composition was prepared by mixing 26 wt % of FEP solids (T-120 FEP, available from Du Pont as a dispersion), and 8.6 wt % of titanium dioxide (R-900).

A glass fabric of the specification of ECC-150 2/2 28×28 having a 8.9 oz/yd$^2$ (300 g/m$^2$) weight commercially available from Clark-Shwebel Fiber Glass Corp., N.Y., was passed through the first layer coating composition at a speed of 3 ft/min (0.9 m/min) and, then, the coating composition was dried and fused by passing it through the dryer. The resulting coated fabric was passed sequentially through the 20 wt % PTFE dispersion once, the 30 wt % PTFE dispersion twice, and the 37.5 wt % PTFE dispersion twice at a speed between 2 and 3.5 ft/min (0.6 and 1 m/min), wherein each coating pass was followed by drying process. The resulting second layer coated glass fabric was then passed through the talc filled PTFE dispersion twice and the titanium filled PTFE dispersion twice at a speed between 2 and 3.5 ft/min with drying after each pass. Finally, the glass fabric was passed through the FEP dispersion at a speed between 2 and 3.5 ft/min and dried.

The resulting coated fabric had a coating pickup-weight distribution of 2.9 oz/yd$^2$ (98 g/m$^2$) of the first layer composition, 5.7 oz/yd$^2$ (193 g/m$^2$) of the second layer composition, 5.3 oz/yd$^2$ (180 g/m$^2$) of the third layer composition, 2.3 oz/yd$^2$ (78 g/m$^2$) of the fourth layer composition, and less than 0.1 oz/yd$^2$ (3 g/m$^2$) of the fifth layer composition.

The resulting coated fabric was subjected to a long-term weathering test using a QUV weather tester (available from Q-Panel Co., Ohio), which was equipped with a series of 40 watt UVB bulbs. A 40 watt UVB bulb provides an ultraviolet light exposure that is more severe than the level at the equator at mid-day. The test specimens were subjected to alternating 4-hour cycles of condensation (100% humidity) and ultraviolet light exposure at 60° C. The exposed test specimens were tested for weight in accordance with the ASTM D751-89 testing procedure, thickness in accordance with ASTMD374-88, strip tensile in accordance with the ASTM D751-89, procedure B, testing procedure and trapezoidal tear strengths in accordance with ASTM D4830-88. The strip tensile after flexfold measurement was made by the following procedure. An example specimen having 2 inch (5 cm) by 10 inch (25 cm. dimensions was folded in half. The folded and creased specimen was laid on a flat wooden surface and rolled with a 10 lb (4.5 kg) steel roller ten times in one direction across the fold. From the resulting specimen, a 1 inch (2.5 cm) by 10 inch (25 cm) test specimen was prepared, and the tensile measurement was taken in accordance with the ASTMD751-89, procedure B, testing procedure.

The results are shown in Table. The physical specification data from a product brochure for a commercial, talc-titanium dioxide filled PTFE coated glass fabric (Raydell #M-26, available from Chemical Fabrics Corp.) are also listed as a comparison (Control).

TABLE

| QUV Weathering | EXAMPLE | | | | | CONTROL |
|---|---|---|---|---|---|---|
| Duration (hours) | 0 | 1000 | 2000 | 4000 | 5000 | 0 |
| Weight (ox/yd$^2$) | 21.6 | 21.6 | 21.6 | 21.6 | 21.6 | 22.5 |
| (g/m$^2$) | 732 | 732 | 732 | 732 | 732 | 763 |
| Thickness (mil) | 16.5 | 16.5 | 16.5 | 16.5 | 16.5 | 18 |
| (μm) | 419 | 419 | 419 | 419 | 419 | 457 |
| Strip Tensile | | | | | | |
| Warp (psi) | 541 | 494 | 377 | 486 | 517 | 325 |
| Fill (psi) | 484 | 448 | 414 | 343 | 458 | 300 |
| Warp (M Pa) | 3.73 | 3.41 | 2.60 | 3.35 | 3.56 | 2.24 |
| Fill (M Pa) | 3.34 | 3.09 | 2.85 | 2.36 | 3.16 | 2.07 |

TABLE-continued

| QUV Weathering | EXAMPLE | | | | | CONTROL |
|---|---|---|---|---|---|---|
| Duration (hours) | 0 | 1000 | 2000 | 4000 | 5000 | 0 |
| Strip Tensile after Flexfold | | | | | | |
| Warp (psi) | 302 | 385 | 237 | 325 | — | 270 |
| Fill (psi) | 300 | 308 | 283 | 315 | 418 | 270 |
| Warp (M Pa) | 2.08 | 2.65 | 1.63 | 2.24 | — | 1.86 |
| Fill (M Pa) | 2.07 | 2.12 | 1.95 | 2.17 | 2.88 | 1.86 |
| Trapezoidal Tear | | | | | | |
| Warp (psi) | 39.8 | 18 | 41.3 | 39 | 36 | 40 |
| Fill (psi) | 44.9 | 21.5 | — | 34 | — | 35 |
| Warp (M Pa) | 0.27 | 0.12 | 0.28 | 0.27 | 0.25 | 0.26 |
| Fill (M Pa) | 0.31 | 0.15 | 0.23 | 0.22 | — | 0.24 |

It can be seen from the above test results that the coated glass fabric of the present invention provides excellent flexibility, weatherability, ultraviolet light-stability, and moisture-resistance characteristics that are suitable for the applications, such as antenna cover, where the fabrics are exposed to harsh environment and extreme weather conditions.

It has unexpectedly been found that the sequentially coated glass fabric of the present invention provides superior physical properties over the prior art fluoropolymer coated glass fabrics. Moreover, it is believed that the present coated glass fabric provides an improved microwave transmissibility over the prior art glass fabrics coated with a talc-titanium dioxide filled fluoropolymer.

What is claimed is:

1. A coated glass fabric having improved flexibility, weatherability, ultraviolet light-stability, and moisture-resistance having coated thereon in sequence coating layers comprising:
   - a first layer of a mixture of a perfluoropolymer and a silicone oil, said silicone oil comprising from about 5 to about 20 wt % based on the weight of the perfluoropolymer;
   - a second layer of a perfluoropolymer;
   - a third layer of a glass or mineral filled perfluoropolymer, said glass or mineral filler comprising from about 30 to about 60 wt % based on the weight of the "third layer" perfluoropolymer;
   - a fourth layer of a titanium dioxide filled perfluoropolymer, said titanium dioxide comprising from about 30 to about 60 wt % based on the weight of the "fourth layer " perfluoropolymer; and
   - a fifth layer of a titanium dioxide filled perfluoropolymer selected from the group consisting of fluorinated ethylene-propylene, perfluoroalkoxy and mixtures thereof, said titanium dioxide comprising from about 20 to about 40 wt % based on the weight of the fifth layer perfluoropolymer.

2. The coated glass fabric according to claim 1, wherein said second layer through said fourth layer further comprise effective amounts of a viscosity enhancing agent and a surfactant.

3. The coated glass fabric according to claim 1, wherein said fifth layer further comprises effective amounts of a viscosity enhancing agent and a surfactant.

4. The coated glass fabric according to claim 1, wherein said perfluoropolymer in each of said first, second, third and fourth layers is independently selected from the group consisting of polytetrafluoroethylene, fluorinated ethylene-propylene, perfluoroalkoxy and mixtures thereof.

5. The coated glass fabric according to claim 1, wherein said perfluoropolymer in each of said first, second, third and fourth layers is polytetrafluoroethylene.

6. The coated glass fabric according to claim 1, wherein said perfluoropolymer of said fifth layer is fluorinated ethylenepropylene.

7. The coated glass fabric according to claim 1, wherein said silicone oil is selected from the group consisting of methylphenyl silicone, dimethyl polysiloxane, dimethylmethylhydrogen siloxane, methylhydrogen siloxane and crosslinked reactive silicone oils.

8. The coated glass fabric according to claim 1, wherein said silicone oil is methylphenyl silicone.

9. The coated glass fabric according to claim 1, wherein said glass or mineral filled perfluoropolymer is filled with a filler selected from the group consisting of talc, glass beads, amorphous silica and mixtures thereof.

10. The coated glass fabric according to claim 1, wherein said glass or mineral filled perfluoropolymer is filled with talc.

11. The coated glass fabric according to claim 1, wherein said coating layers comprise:
   - from about 1 to about 5 $oz/yd^2$ of said first layer,
   - from about 3 to 10 $oz/yd^2$ of said second layer,
   - from about 3 to about 8 $oz/yd^2$ of said third layer,
   - from about 0.5 to about 5 $oz/yd^2$ of said fourth layer, and
   - from about 0.05 to about 1 $oz/yd^2$ of said fifth layer.

12. An antenna cover fabricated from the coated glass fabric according to claim 1.

13. A coated glass fabric having improved flexibility, weatherability, ultraviolet light-stability, and moisture-resistance having coated thereon in sequence coating layers comprising:
   - a first layer of a mixture of a perfluoropolymer and a silicone oil, said silicone oil comprising from about 5 to about 20 wt % based on the weight of the perfluoropolymer;
   - a second layer of a perfluoropolymer;
   - a third layer consisting essentially of a glass or mineral filled perfluoropolymer, said glass or mineral filler comprising from about 30 to about 60 wt % based on the weight of the "third layer " perfluoropolymer;
   - a fourth layer consisting essentially of a titanium dioxide filled perfluoropolymer, said titanium dioxide comprising from about 30 to about 60 wt % based on the weight of the fourth layer perfluoropolymer; and
   - a fifth layer consisting essentially of a titanium dioxide filled perfluoropolymer selected from the group consisting of fluorinated ethylene-propylene, perfluoroalkoxy and mixtures thereof, said titanium dioxide comprising from about 20 to about 40 wt % based on the weight of the fifth layer perfluoropolymer.

* * * * *